US012175915B2

(12) United States Patent
Liu et al.

(10) Patent No.: US 12,175,915 B2
(45) Date of Patent: Dec. 24, 2024

(54) METHOD AND APPARATUS FOR STORING AND READING DATA, NON-VOLATILE STORAGE MEDIUM, AND IMAGE PROCESSING DEVICE

(71) Applicant: LEYARD OPTOELECTRONIC CO., LTD., Beijing (CN)

(72) Inventors: Chengqian Liu, Beijing (CN); Zhiyong Liu, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 0 days.

(21) Appl. No.: 18/207,660

(22) Filed: Jun. 8, 2023

(65) Prior Publication Data

US 2023/0419876 A1 Dec. 28, 2023

(30) Foreign Application Priority Data

Jun. 24, 2022 (CN) ........................ 202210727104.7

(51) Int. Cl.
*G09G 3/20* (2006.01)

(52) U.S. Cl.
CPC ... *G09G 3/2092* (2013.01); *G09G 2310/0208* (2013.01); *G09G 2320/0285* (2013.01); *G09G 2320/0295* (2013.01); *G09G 2320/0613* (2013.01); *G09G 2320/08* (2013.01)

(58) Field of Classification Search
CPC ......... G09G 3/2092; G09G 2310/0208; G09G 2320/0285; G09G 2320/0295; G09G 2320/0613; G09G 2320/08; G09G 2300/026; G09G 5/395; G09G 3/2088; G09G 3/32; G09G 2360/04; G09G 2360/122; G09G 3/36; G02F 1/133
See application file for complete search history.

(56) References Cited

U.S. PATENT DOCUMENTS

| | | | | |
|---|---|---|---|---|
| 2002/0130876 A1* | 9/2002 | Champion | ............... | H04N 5/14 348/E7.003 |
| 2008/0055328 A1 | 3/2008 | Shin et al. | | |
| 2009/0147130 A1 | 6/2009 | Kim | | |
| 2010/0309100 A1* | 12/2010 | Cok | ..................... | G09G 3/3208 345/76 |

(Continued)

OTHER PUBLICATIONS

The extended European search report of the corresponding EP patent application No. 23178490.1, mail date Nov. 14, 2023.

*Primary Examiner* — Jose R Soto Lopez
(74) *Attorney, Agent, or Firm* — Samson G. Yu

(57) ABSTRACT

Provided are a method and apparatus for storing and reading data, a non-volatile storage medium, and an image processing device. The method includes: target pixel data of an original image for display in a plurality of lamp panels and a pixel parameter corresponding to each piece of pixel data are acquired; according to a pixel address mapping relationship and the pixel parameter, adjacent addresses in a memory are allocated to the pixel data respectively corresponding to different lamp panels in the target pixel data, so as to determine a memory location where each piece of pixel data is stored in the memory; the target pixel data is stored to the memory according to the memory location; a set of adjacent pixel data is successively read out from the memory at every time until all the target pixel data is read out from the memory.

11 Claims, 3 Drawing Sheets

(56) References Cited

U.S. PATENT DOCUMENTS

| | | | | |
|---|---|---|---|---|
| 2017/0010845 | A1* | 1/2017 | Noguchi | G09G 3/3426 |
| 2019/0027089 | A1* | 1/2019 | Moribe | H01L 33/00 |
| 2019/0295457 | A1* | 9/2019 | Li | G09G 3/32 |
| 2021/0142767 | A1* | 5/2021 | Mo | G06F 1/08 |
| 2021/0233462 | A1* | 7/2021 | Ding | G09G 3/32 |
| 2021/0407441 | A1* | 12/2021 | Gu | G09G 3/3426 |
| 2022/0066543 | A1* | 3/2022 | Rhyu | H04W 4/30 |
| 2024/0046891 | A1* | 2/2024 | Li | G09G 3/36 |
| 2024/0062708 | A1* | 2/2024 | Gu | G09G 3/32 |

* cited by examiner

METHOD AND APPARATUS FOR STORING AND READING DATA, NON-VOLATILE STORAGE MEDIUM, AND IMAGE PROCESSING DEVICE

TECHNICAL FIELD

The present disclosure relates to the field of image processing, and in particular to a method and apparatus for storing and reading data, a non-volatile storage medium, and an image processing device.

BACKGROUND

In the related art, an image signal stream provided for a Light Emitting Diode (LED) display device needs to be processed in advance, starting from the acquisition of data from a video source, the whole data processing flow includes that: 1, an original video stream is acquired from the video source (a computer graphics card, etc.); 2, High Definition Multimedia Interface (HDMI) decoding is performed on the original video stream by a video access board; 3, the decoded video stream is provided to a signal distribution board, and the signal distribution board performs image cutting to obtain an image corresponding to a module control board of each module of a large display screen; 4, after obtaining the cut original video stream, the module control board performs data processing on the original video stream, generates a control constant current source driving signal and drives an LED; and 5, a constant current source drives an LED module to display a video.

In the above process, after data of an original image enters the module control board, since the module control board needs to firstly store the data of the original image in a memory for caching, and then take the data out of the memory for processing or send same to a lamp panel driver chip in the display module, and the lamp panel driver chip generates a drive current to light up a lamp bead in the lamp panel. However, in the related art, since the arrangement order of the lamp panels in each module and the arrangement manner of a string of lamp panel driver chips corresponding to each lamp panel are different, the module control board may only take a piece of pixel data of the original image from the memory every time until all the pixel data is taken out of the memory and completes processing, and then send same to the driver chip. The processing speed of the above processing flow is slow, resulting in the technical problems such as low performance and image delay in the module control board.

For the above problems, no effective solution has been proposed.

SUMMARY

Embodiments of the present disclosure provide a method and apparatus for storing and reading data, a non-volatile storage medium, and an image processing device to solve the technical problem of relatively overall slow on storing and reading pixel data caused by storing and reading a piece of pixel data of an image in a memory every time.

According to an aspect of the embodiments of the present disclosure, a data access method is provided, which may include that: target pixel data of an original image and a pixel parameter corresponding to each piece of pixel data in the target pixel data are acquired, the original image being an image for display in a plurality of lamp panels, and the pixel parameter including a corresponding relationship between each piece of pixel data in the target pixel data and the plurality of lamp panels; according to a pixel address mapping relationship and the pixel parameter, adjacent addresses in a memory are allocated to the pixel data respectively corresponding to different lamp panels in the target pixel data, so as to determine a memory location where each piece of pixel data in the target pixel data is stored in the memory; each piece of pixel data in the target pixel data is stored to the memory according to the memory location; and according to the pixel address mapping relationship, a set of adjacent pixel data is successively read out from the memory every time until all the target pixel data is read out from the memory, the target pixel data including the adjacent pixel data, and the set of adjacent pixel data including pixel data having adjacent addresses in the memory and respectively corresponding to different lamp panels in the plurality of lamp panels.

As at least one alternative embodiment, the operation of acquiring the pixel parameter corresponding to each piece of pixel data in the target pixel data may include that: lamp panel information corresponding to each piece of pixel data in the target pixel data and a location parameter of each piece of pixel data in a lamp panel are acquired, the pixel parameter including the lamp panel information and the location parameter, and the location parameter including a cascade number, a scan number and a channel number of a lamp panel driver chip corresponding to each piece of pixel data.

As at least one alternative embodiment, the operation of allocating, according to the pixel address mapping relationship and the pixel parameter, adjacent addresses in the memory to the pixel data respectively corresponding to different lamp panels in the target pixel data, so as to determine the memory location where each piece of pixel data in the target pixel data is stored in the memory may include that: according to the pixel address mapping relationship and the pixel parameter, the adjacent addresses in the memory are allocated to the pixel data corresponding to different lamp panels but having matched location parameters in the target pixel data, so as to determine the memory location where each piece of pixel data in the target pixel data is stored in the memory.

As at least one alternative embodiment, the operation of successively reading out, according to the pixel address mapping relationship, a set of adjacent pixel data from the memory at a time may include that: a set of memory locations in the memory is determined according to the pixel address mapping relationship, the set of memory locations including a plurality of adjacent addresses, and pixel data in the plurality of adjacent addresses respectively correspond to different lamp panels but have the matched location parameters; and the pixel data stored in the memory location in the memory is successively read out at once to obtain the set of adjacent pixel data.

As at least one alternative embodiment, the operation of acquiring the location parameter corresponding to each piece of pixel data in the target pixel data may include that: a pre-stored pixel address mapping table is read, the pixel address mapping table being configured to record a mapping relationship between a pixel and the cascade number and the channel number of the lamp panel driver chip; and a cascade number and a channel number corresponding to each piece of pixel data in the target pixel data are acquired from the pixel address mapping table.

As at least one alternative embodiment, the operation of acquiring the location parameter corresponding to each piece of pixel data in the target pixel data may include that:

scanning information of the target pixel data is acquired from an image decoding device, the image decoding device being configured to send the target pixel data of the original image; and according to the scanning information, the scan number corresponding to each piece of pixel data in the target pixel data is determined.

As at least one alternative embodiment, the method may further include that: according to a reading order of the adjacent pixel data, data operation processing is successively performed on each set of adjacent pixel data until all the target pixel data is processed to obtain pixel data to be displayed; and the pixel data to be displayed is sent to the lamp panel driver chips of the plurality of lamp panels.

According to another aspect of the embodiments of the present disclosure, a data access apparatus is also provided, which may include: an acquisition module, configured to acquire target pixel data of an original image and a pixel parameter corresponding to each piece of pixel data in the target pixel data, the original image being an image for display in a plurality of lamp panels, and the pixel parameter including a corresponding relationship between each piece of pixel data in the target pixel data and the plurality of lamp panels; a determination module, configured to allocate, according to a pixel address mapping relationship and the pixel parameter, adjacent addresses in a memory to the pixel data respectively corresponding to different lamp panels in the target pixel data, so as to determine a memory location where each piece of pixel data in the target pixel data is stored in the memory; a storage module, configured to store the target pixel data to the memory according to the memory location; and a reading module, configured to successively read out, according to the pixel address mapping relationship, a set of adjacent pixel data from the memory every time until all the target pixel data is read out from the memory, the target pixel data including the adjacent pixel data, and the set of adjacent pixel data includes pixel data having adjacent addresses in the memory and respectively corresponding to different lamp panels in the plurality of lamp panels.

According to yet another aspect of the embodiments of the present disclosure, a non-volatile storage medium is also provided, which may include a stored program. The program, when running, controls a device where the non-volatile storage medium is located to perform any one of the above data access methods.

According to still yet another aspect of the embodiments of the present disclosure, a computer device is also provided, which may include a processor configured to run a program. The program, when running, performs any one of the above data access methods.

In the embodiments of the present disclosure, a manner of storing and reading the pixel data on the basis of the pixel address mapping relationship and the pixel parameter of the pixel data is adopted, and by storing the pixel data corresponding to different lamp panels as a set of adjacent pixel data in the adjacent addresses in the memory and reading same at the same time, the purpose of supporting reading a plurality of pieces of pixel data from the memory at a time for data processing is achieved, thereby achieving the technical effect of increasing the reading speed of the image pixel data in the memory, and further solving the technical problem of relatively overall slow on storing and reading the pixel data caused by accessing a piece of pixel data of the image from the memory every time.

BRIEF DESCRIPTION OF THE DRAWINGS

The drawings described herein are used to provide a further understanding of the present disclosure, and constitute a part of the present disclosure, and the exemplary embodiments of the present disclosure and the description thereof are used to explain the present disclosure, but do not constitute improper limitations to the present disclosure. In the drawings.

DETAILED DESCRIPTION OF THE EMBODIMENTS

In order to make the solutions of the present disclosure understood by those skilled in the art, the technical solutions in the embodiments of the present disclosure will be clearly and completely described below in combination with the drawings in the embodiments of the present disclosure. It is apparent that the described embodiments are not all embodiments but only part of embodiments of the present disclosure. All other embodiments obtained by those of ordinary skill in the art on the basis of the embodiments in the present disclosure without creative work shall fall within the scope of protection of the present disclosure.

It is to be noted that terms “first”, “second” and the like in the description, claims and the above drawings of the present disclosure are used for distinguishing similar objects rather than describing a specific sequence or a precedence order. It should be understood that the data used in such a way may be exchanged where appropriate, in order that the embodiments of the present disclosure described here may be implemented in an order other than those illustrated or described herein. In addition, terms “include” and “have” and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

An embodiment of the present disclosure provides an embodiment of a method for storing and reading data. It is to be noted that the steps shown in the flowchart of the drawings may be executed in a computer system, such as a set of computer-executable instructions, and although a logical sequence is shown in the flowchart, in some cases, the steps shown or described may be executed in a different order than here.

Figure 1:
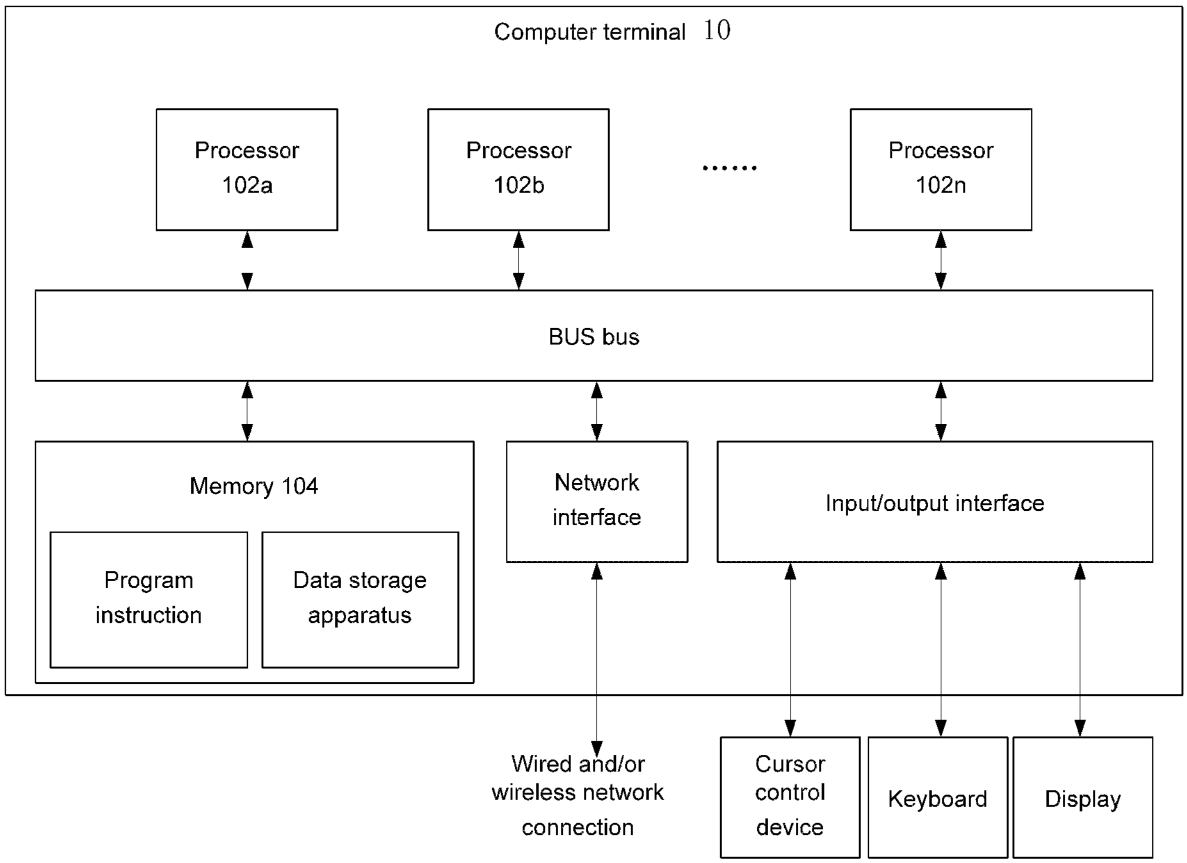
FIG. 1 shows a block diagram of a hardware structure of a computer terminal for implementing a data access method.

The method embodiment provided by Embodiment 1 of the present disclosure may be implemented in a mobile terminal, a computer terminal or a similar computing device. FIG. 1 shows a block diagram of a hardware structure of a computer terminal for implementing a data access method. As shown in FIG. 1, a computer terminal 10 may include one or more (shown as 102*a*, 102*b*, . . . , 102*n* in the figure) processors (which may include, but is not limited to, a processing apparatus such as a Micro Controller Unit (MCU) or a Field Programmable Gate Array (FPGA)) and a memory 104 configured to store data. In addition, the above computer terminal may further include: a display, an Input/Output interface (I/O interface), a Universal Serial Bus (USB) port (which may be included as one of ports of a BUS bus), a network interface, a power supply, and/or a camera. Those of ordinary skill in the art may understand that the structure shown in FIG. 1 is merely illustrative, and does not limit the structure of the above electronic apparatus. For example, the computer terminal 10 may further include more or fewer components than shown in FIG. 1, or has a different configuration from that shown in FIG. 1.

It is to be noted that one or more processors and/or other data processing circuits may be generally referred to herein as "data processing circuits". The data processing circuit may be embodied in whole or in part as software, hardware, firmware, or any other combination. Further, the data processing circuit may be a single and stand-alone processing module, or combined in whole or in part in any of other elements of the computer terminal 10. As referred to in the embodiments of the present disclosure, the data processing circuit acts as a processor control (such as selection of a variable resistance terminal path connected to the interface).

The memory 104 may be configured to store a software program and a module of invention software, such as a program instruction/data storage apparatus corresponding to the data access method in the embodiments of the present disclosure, and the processor performs various functional inventions and data processing by running the computer program and the module stored in the memory 104, that is, implements the data assess method for the invention program. The memory 104 may include a high speed Random Access Memory (RAM) and may also include a non-volatile memory such as one or more magnetic storage apparatuses, a flash memory, or other non-volatile solid state memories. In some examples, the memory 104 may further include memories remotely located relative to the processor, which may be connected to the computer terminal 10 through a network. The examples of the above network include, but are not limited to, Internet, Intranet, local area networks, mobile communication networks, and combinations thereof.

The display may be, for example, a touch screen type Liquid Crystal Display (LCD) that enables a user to interact with a user interface of the computer terminal 10.

In the related art, LED lamp beads in an LED display screen correspond to pixel points in a video image one by one, but each display module may include a plurality of lamp panels, the lamp panels corresponding to a plurality of cross-flow driver chips. The arrangement of the driver chips corresponding to the lamp panels may vary, and the number of the adopted driver chips may also vary. Therefore, the relationship between each pixel point and an output channel of the lamp panel driver chip may be different for different hardware circuits. Limited by this, after a module control board stores image data of a video to a memory, pixel data corresponding to a continuous channel in the same lamp panel driver chip is stored in different locations in the memory, and a physical mechanism of the memory makes it not support reading a plurality of pieces of data from discontinuous addresses at one time. Therefore, in the related art, only a piece of pixel data may be acquired from the memory at one time, and the pixel data is processed in combination with a correction coefficient or other types of parameters to obtain data output to the lamp panel driver chip and sent to the lamp panel driver chip. It is apparent that since the above process may only acquire a piece of pixel data from the memory at one time, the speed of reading all the image data from the memory is very slow, which affects the overall speed of the module control board in processing the image, and may further cause the module control board to be unable to process a frame of image within one frame time interval of the video and send same to the lamp panel driver chip. As a result, the input video image and the output video image in the module control board have to be separated by two frames, resulting in unnecessary time delay.

Figure 2:
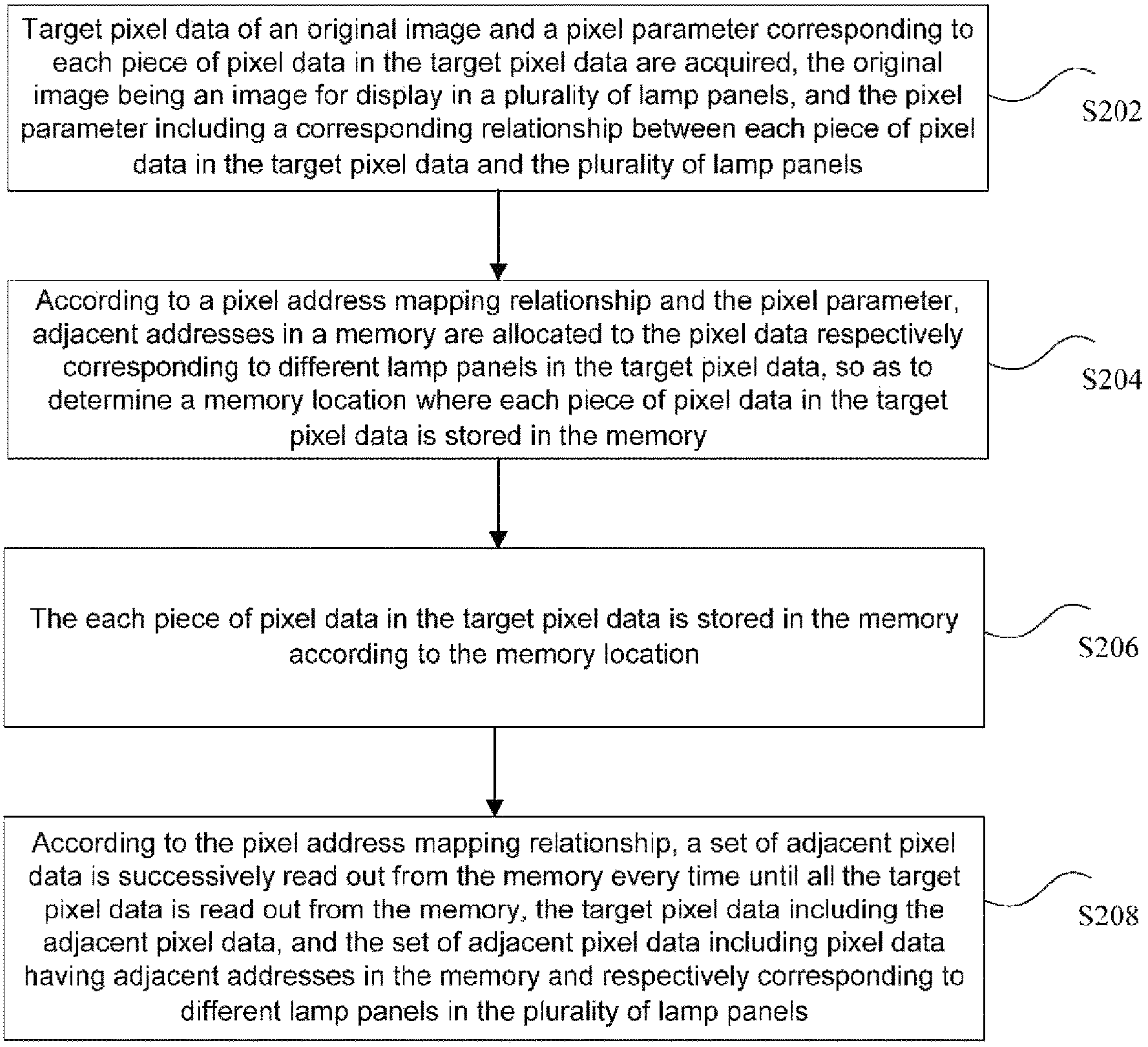
FIG. 2 is a flowchart of a method for storing and reading data according to an embodiment of the present disclosure.

In order to implement the flexible design and convenient layout and wiring of the hardware circuit, the solution designs a method for storing and reading data which may be used in the module control board to solve the above problems. FIG. 2 is a flowchart of a method for storing and reading data according to an embodiment of the present disclosure, as shown in FIG. 2, the method includes the following steps.

At S202, target pixel data of an original image and a pixel parameter corresponding to each piece of pixel data in the target pixel data are acquired, the original image being an image for display in a plurality of lamp panels, and the pixel parameter including a corresponding relationship between each piece of pixel data in the target pixel data and the plurality of lamp panels.

It is to be noted that the original image may be a frame of image in an input video in a module control board, the module control board needs to cache the frame of image into a memory firstly, read from the memory to perform image processing, and then send the processed image data to a lamp panel driver chip, and the lamp panel driver chip generates a drive current to light up a lamp bead of the lamp panel. As an example embodiment, the lamp panel driver chip may be a constant current source driver chip. Each piece of pixel data in the target pixel data may correspond to a pixel point in the original image, and the complete original image, namely, the processed image, needs the plurality of lamp panels to be fully displayed. Therefore, the pixel parameter includes information about which lamp panel of the plurality of lamp panels each piece of pixel data in the target pixel data should correspond to. It is to be noted that each piece of pixel data in the target pixel data corresponds to only one lamp panel of the plurality of lamp panels.

At S204, according to a pixel address mapping relationship and the pixel parameter, adjacent addresses in a memory are allocated to the pixel data respectively corresponding to different lamp panels in the target pixel data, so as to determine a memory location where each piece of pixel data in the target pixel data is stored in the memory.

It is to be noted that the adjacent addresses are the plurality of continuous addresses in the memory. The pixel data of different lamp panels are successively stored in the continuous adjacent addresses, so that the pixel data in the adjacent addresses may be read out at one time when the data is read, then batch processing is performed on the pixel data respectively corresponding to the plurality of lamp panels, and then the processed pixel data is respectively sent to the lamp panel driver chip of each lamp panel, thereby implementing synchronous batch processing of the pixel data.

At S206, The each piece of pixel data in the target pixel data is stored to the memory according to the memory location.

At S208, according to the pixel address mapping relationship, a set of adjacent pixel data is successively read out from the memory at one time until all the target pixel data is read out from the memory, the target pixel data including the adjacent pixel data, and the set of adjacent pixel data including pixel data having adjacent addresses in the memory and respectively corresponding to different lamp panels in the plurality of lamp panels.

In the above steps, a manner of storing and reading the pixel data on the basis of the pixel address mapping relationship and the pixel parameter of the pixel data is adopted, and by storing the pixel data corresponding to different lamp panels as a set of adjacent pixel data in the adjacent addresses in the memory and reading same at the same time, the purpose of supporting reading a plurality of pieces of pixel data from the memory at one time for data processing is achieved, thereby achieving the technical effect of increasing the reading speed of the image pixel data in the memory, and further solving the technical problem of relatively slow overall access to the pixel data caused by accessing a piece of pixel data of the image from the memory at a time.

As an optional embodiment, the pixel parameter corresponding to each piece of pixel data in the target pixel data may be acquired in the following manner: lamp panel information corresponding to each piece of pixel data in the target pixel data and a location parameter of each piece of pixel data in the lamp panel are acquired, the pixel parameter including the lamp panel information and the location parameter, and the location parameter including a cascade number, a scan number and a channel number of the lamp panel driver chip corresponding to each piece of pixel data.

As at least one alternative embodiment, the lamp panel information may be configured to represent which lamp panel in the display module each piece of pixel data corresponds to, that is. on which lamp panel the pixel point in the image corresponding to the pixel data should be displayed. The location parameter of the pixel data in the lamp panel may be configured to represent the specific location in the lamp panel where each piece of pixel data should be displayed, for example, the location of the lamp bead in the lamp panel corresponding to the pixel data. It is to be noted that, in order to drive the lamp bead in the lamp panel, the plurality of lamp panel driver chips may be used to provide a drive current for the lamp panel, the plurality of lamp panel driver chips may be connected in series to form a cascade structure, and the location of each lamp panel driver chip in a string of lamp panel driver chips in the lamp panel may be represented by the cascade number; the scan number of each piece of pixel data may also be determined corresponding to a scanning line of the image; and there are a plurality of channels in each lamp panel driver chip, and each channel transports the drive current to the lamp beads at different positions, so that the location of the lamp bead in the lamp panel driver chip also corresponds to one channel number. Therefore, the location of the lamp bead corresponding to each piece of pixel data may be determined by using the cascade number, the scan number and the channel number of the lamp panel driver chip, and the location of the lamp bead corresponding to the pixel data, and the time sequence order in which the pixel data in the module control board needs to be processed and sent to the lamp panel driver chip may be determined on the basis of the above information.

As an optional embodiment, the memory location where each piece of pixel data in the target pixel data is stored to the memory may be determined in the following manner: according to the pixel address mapping relationship and the pixel parameter, the adjacent addresses in the memory are allocated to the pixel data corresponding to different lamp panels but having matched location parameters in the target pixel data, so as to determine the memory location where each piece of pixel data in the target pixel data is stored in the memory.

In this optional embodiment, the adjacent addresses in the memory may store a set of pixel data as follows: in a case where there are four lamp panels in the module, each set of adjacent addresses includes four addresses in which four pieces of pixel data are respectively stored, the four pieces of pixel data respectively corresponding to the four lamp panels, and the cascade number, the scan number and the channel number of the four pieces of pixel data being the same. According to the above manner, all the data in the target pixel data is organized into the same arrangement mode and stored in the memory, which may ensure that the pixel data belonging to different lamp panels but having the same cascade number, scan number and channel number are stored adjacently in the memory, so as to facilitate subsequent rapid data readout.

As an optional embodiment, according to the pixel address mapping relationship, a set of adjacent pixel data may be successively read out from the memory at a time in the following manner: a set of memory locations in the memory is determined according to the pixel address mapping relationship, the set of memory locations including a plurality of adjacent addresses, and respective pixel data in the plurality of adjacent addresses respectively correspond to different lamp panels but have the matched location parameters; and the pixel data stored in the memory location in the memory is successively read out at once to obtain the set of adjacent pixel data.

According to the above manner, all the data in the target pixel data is organized into the arrangement mode in the above embodiment and stored in the memory, which may ensure that the pixel data belonging to different lamp panels but having the same cascade number, scans and channels are stored adjacently in the memory. Since the reading mechanism of the memory may read the data in the continuous memory addresses together, the above data storage manner facilitates subsequent reading of the pixel data corresponding to different lamp panels but having the matched location parameters together, which increases the data reading speed and improves the overall processing efficiency of the image data.

As an optional embodiment, the operation of acquiring a location parameter corresponding to each piece of pixel data in the target pixel data may include the following steps: a pre-stored pixel address mapping table is read, the pixel address mapping table being configured to record a mapping relationship between a pixel and the cascade number and the channel number of the lamp panel driver chip; and a cascade number and a channel number corresponding to each piece of pixel data in the target pixel data are acquired from the pixel address mapping table. For example, the pixel address mapping table may be pre-stored, and called according to the cache requirement of the target pixel data, so as to implement rapid matching between the pixel data and the memory location.

As an optional embodiment, the operation of acquiring a location parameter corresponding to each piece of pixel data in the target pixel data may further include the following steps: scanning information of the target pixel data is acquired from an image decoding device, the image decoding device being configured to send the target pixel data of the original image; and according to the scanning information, the scan number corresponding to each piece of pixel data in the target pixel data is determined.

As at least one alternative embodiment, the image decoding device may be an upstream device of the module control board, for example, an upstream FPGA. After processing the video, the FPGA obtains the original image and the scan number of each pixel in the original image, and then sends the target pixel data and the scan number to the module control board. The module control board may directly determine the scan number of each piece of pixel data in the target pixel data according to the scan number acquired from the FPGA. In this way, the scan number of the pixel data may not be stored in the pixel address mapping table so as to reduce a local storage pressure.

As an optional embodiment, the method may further include the following subsequent process: according to a reading order of the adjacent pixel data, data operation processing is successively performed on each set of adjacent pixel data until all the target pixel data is processed to obtain pixel data to be displayed; and the pixel data to be displayed is sent to the lamp panel driver chips of the plurality of lamp panels.

It is to be noted that the processing of the pixel data corresponding to a single lamp panel needs to be performed successively according to the cascade number, the scan number and the channel number of the lamp panel driver chip in the lamp panel, so as to complete the processing of the pixel data corresponding to one lamp panel. Therefore, by using the method provided in the above embodiment, the pixel data matched with the cascade numbers, the scan numbers and the channel numbers of the plurality of lamp panels may be simultaneously taken out of the memory and processed as data of the same batch uniformly, then the processed data may be distributed to the lamp panel driver chip in each lamp panel. At the same time, next set of adjacent pixel data is acquired from the memory, the pixel data in the next set of adjacent pixel data still respectively corresponds to the plurality of lamp panels, and has the matched cascade number, the scan number and the channel number, but the cascade number, the scan number and the channel number may change compared with the previous set of adjacent pixel data. The above process is repeatedly executed, and in a case where the cascade number and the scan number are unchanged, the pixel data corresponding to different numbers of channels in each lamp panel is successively read out and processed. Then, the scan number is updated, and the pixel data corresponding to different channel numbers in the next scan is processed. When the pixel data of an object of one lamp panel driver chip is processed, the cascade number is updated, and the pixel data corresponding to the next lamp panel driver chip is read out from the memory and processed until the target pixel data is read out and processed, that is, the image processing process of the original image is completed.

Based on the above method of the present disclosure, a map address distribution technology may be provided. The map address distribution technology may pre-store the above pixel address mapping table in the module control board, and the cascade number and the scan number corresponding to the lamp panel driver chip for each pixel in the image, and which channel in the lamp drive chip may be determined on the basis of the pixel address mapping table. For example, the scan number may be calculated in the upstream FPGA, and the cascade number and the channel number are stored in the pixel address mapping table and determined by looking up information in the pixel address mapping table. After having these pieces of information, the received pixel data may be cached into the corresponding location of the memory according to the address corresponding relationship of the cascade number, the scan number and the channel number, and then during the time of the next frame, these pieces of data are successively read out from the memory according to the time sequence requirements to perform correction operation, gamma operation, gamut operation or brightness operation, and finally the operation result is sent to the lamp panel driver chip to be finally displayed on the display screen.

Figure 3:
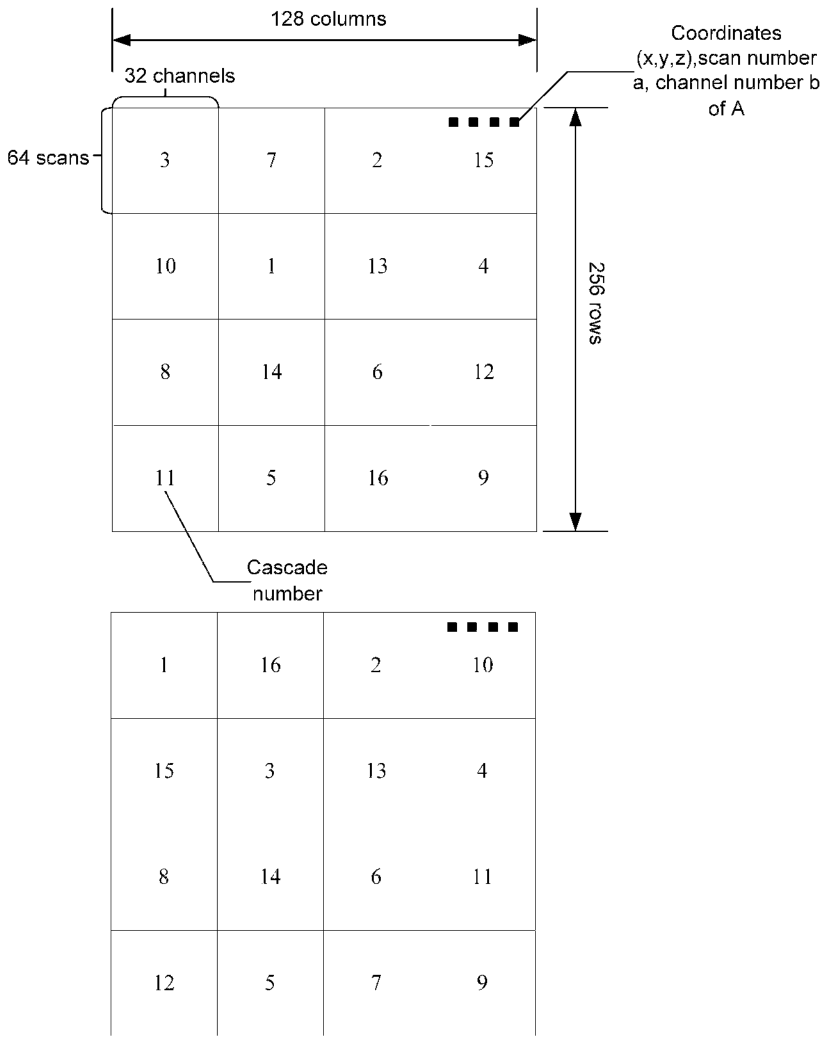
FIG. 3 is a schematic diagram of a pixel address mapping relationship according to an optional implementation mode of the present disclosure.

FIG. 3 is a schematic diagram of a pixel address mapping relationship according to an optional implementation mode of the present disclosure. FIG. 3 shows a lamp panel driver chip string of two lamp panels, each lamp panel driver chip string including 16 lamp panel driver chips, and the cascade number being labeled from 1-16. Each lamp panel driver chip string is responsible for controlling the display of 256 rows×128 columns of light points on the screen, so that each lamp panel driver chip is responsible for driving the light points corresponding to 64 scanning lines and 32 channels. It is apparent that the corresponding location of each pixel point in the original image on the lamp panel may be determined on the basis of a set of the number of cascades, the number of scans and the number of channels, for example, the location corresponding to a piece of pixel data A in the lamp panel is represented by coordinates (x, y, z), then the corresponding cascade number thereof is 15, the scan number is a, and the channel number is b, then the corresponding location coordinates thereof may be recorded as (15, a, b), the adjacent addresses may be allocated to the pixel data with the corresponding location coordinates of (15, a, b) in each lamp panel in the memory, and these pixel data are successively stored in the adjacent addresses, so as to facilitate subsequent rapid data readout.

It is to be noted that, for simple description, each of the above method embodiments is expressed as a combination of a series of operations, but those skilled in the art should know that the present disclosure is not limited to the described operation sequence because some steps may be executed in other sequences or at the same time according to the present disclosure. Second, those skilled in the art should also know that all the embodiments described in the specification are optional embodiments and involved operations and modules are not always required by the present disclosure.

Through the description of the above implementation modes, those skilled in the art may clearly understand that the data access method according to the above embodiment may be implemented by means of software and a necessary general hardware platform, and of course, may also be implemented through hardware, but in many cases, the former is a better implementation mode. Based on such understanding, the technical solution of the present disclosure, which is essential or contributes to the conventional art, may be embodied in the form of a software product. The computer software product is stored in a storage medium (such as a Read-Only Memory (ROM)/RAM, a magnetic disk and an optical disc), including a number of instructions for causing a terminal device (which may be a mobile phone, a computer, a server, or a network device, etc.) to perform the methods described in various embodiments of the present disclosure.

Figure 4:
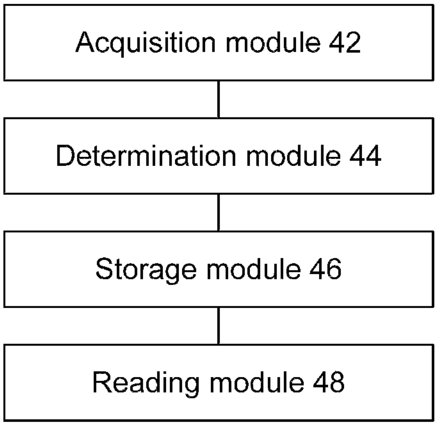
FIG. 4 is a structural block diagram of an apparatus for storing and reading data according to an embodiment of the present disclosure.

According to the embodiments of the present disclosure, an apparatus for storing and reading data for implementing the above method for storing and reading data is also provided. FIG. 4 is a block diagram of an apparatus for storing and reading data according to an embodiment of the present disclosure. As shown in FIG. 4, the apparatus for storing and reading data includes: an acquisition module 42, a determination module 44, a storage module 46, and a reading module 48. The data access apparatus will be described below.

The acquisition module 42 is configured to acquire target pixel data of an original image and a pixel parameter corresponding to each piece of pixel data in the target pixel data, the original image being an image for display in a plurality of lamp panels, and the pixel parameter including a corresponding relationship between each piece of pixel data in the target pixel data and the plurality of lamp panels.

The determination module 44 is connected to the above acquisition module 42, and is configured to allocate, according to a pixel address mapping relationship and the pixel parameter, adjacent addresses in a memory to the pixel data respectively corresponding to different lamp panels in the target pixel data, so as to determine a memory location where each piece of pixel data in the target pixel data is stored in the memory.

The storage module 46 is connected to the determination module 44, and is configured to store each piece of pixel data in the target pixel data to the memory according to the memory location.

The reading module 48 is connected to the storage module 46, and is configured to successively read out, according to the pixel address mapping relationship, a set of adjacent pixel data from the memory at one time until all the target pixel data is read out from the memory, the target pixel data including the adjacent pixel data, and the set of adjacent pixel data including pixel data having adjacent addresses in the memory and respectively corresponding to different lamp panels in the plurality of lamp panels.

It is to be noted herein that the above acquisition module 42, the determination module 44, the storage module 46 and the reading module 48 correspond to S202 to S208 in the embodiment, and a plurality of modules are the same as the examples and invention scenarios implemented by the corresponding steps, but are not limited to the contents disclosed in the above embodiment. It is to be noted that the above modules may run in the computer terminal 10 provided in the embodiment as part of the apparatus.

The embodiments of the present disclosure may provide an image processing device. For example, the image processing device may be located in at least one of a plurality of network devices of a computer network in this embodiment. The image processing device includes a memory and a processor.

Herein, the memory may be configured to store a software program and a module, such as a program instruction/module corresponding to the data access method and apparatus in the embodiment of the present disclosure, and the processor performs various functional inventions and data processing by running the software program and the module stored in the memory, that is, implements the above data assess method. The memory may include a high speed RAM and may also include a non-volatile memory such as one or more magnetic storage apparatuses, a flash memory, or other non-volatile solid state memories. In some examples, the memory may further include memories remotely located relative to the processor, which may be connected to the computer terminal through a network. The examples of the above network include, but are not limited to, Internet, Intranet, local area networks, mobile communication networks, and combinations thereof.

The processor may call the information and the invention program stored in the memory through a transmission device so as to execute the following steps: target pixel data of an original image and a pixel parameter corresponding to each piece of pixel data in the target pixel data are acquired, the original image being an image for display in a plurality of lamp panels, and the pixel parameter including a corresponding relationship between each piece of pixel data in the target pixel data and the plurality of lamp panels; according to a pixel address mapping relationship and the pixel parameter, adjacent addresses in a memory are allocated to the pixel data respectively corresponding to different lamp panels in the target pixel data, so as to determine a memory location where each piece of pixel data in the target pixel data is stored in the memory; the target pixel data is stored to the memory according to the memory location; and according to the pixel address mapping relationship, a set of adjacent pixel data is successively read out from the memory at a time until all the target pixel data is read out from the memory, the target pixel data including the adjacent pixel data, and the set of adjacent pixel data including pixel data having adjacent addresses in the memory and respectively corresponding to different lamp panels in the plurality of lamp panels.

Those of ordinary skill in the art should know that all or part of the steps in various methods of the above embodiment may be implemented by terminal device related hardware instructed through a program, the program may be stored in a non-volatile storage medium, and the storage program includes: a flash disk, an ROM, an RAM, a magnetic disk or a compact disc.

The embodiments of the present disclosure also provide a non-volatile storage medium. Optionally, in the embodiment, the above non-volatile storage medium may be configured to store program codes executed by the data access method provided in the above embodiment.

As at least one alternative embodiment, in the embodiment, the non-volatile storage medium may be located in any one computer terminal in a computer terminal in a computer network set in a computer network or in any one mobile terminal in a mobile terminal set.

As at least one alternative embodiment, in the embodiment, the non-volatile storage medium is arranged to store program codes for performing the following steps: target pixel data of an original image and a pixel parameter corresponding to each piece of pixel data in the target pixel data are acquired, the original image being an image for display in a plurality of lamp panels, and the pixel parameter including a corresponding relationship between each piece of pixel data in the target pixel data and the plurality of lamp panels; according to a pixel address mapping relationship and the pixel parameter, adjacent addresses are allocated to the pixel data respectively corresponding to different lamp panels in the target pixel data in a memory, so as to determine a memory location where each piece of pixel data in the target pixel data is stored in the memory; the target pixel data is stored in the memory according to the memory location; and according to the pixel address mapping relationship, a set of adjacent pixel data is successively read out from the memory at a time until all the target pixel data is read out from the memory, the target pixel data including the adjacent pixel data, and the set of adjacent pixel data including pixel data having adjacent addresses in the memory and respectively corresponding to different lamp panels in the plurality of lamp panels.

The sequence numbers of the embodiments of the present disclosure are adopted not to represent superiority-inferiority of the embodiments but only for description.

In the above embodiments of the present disclosure, the description of the embodiments has its own focus. For parts that are not described in detail in a certain embodiment, reference may be made to related descriptions of other embodiments.

In the several embodiments provided in the present disclosure, it should be understood that, the disclosed technical content may be implemented in other ways. The apparatus embodiments described above are merely illustrative. For example, the division of the units may be a logical function division, and there may be other divisions in actual implementation. For example, a plurality of units or components may be combined or integrated into another system, or some features may be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, the components may be located in one place, or may be distributed on the plurality of units. Part or all of the units may be selected according to actual requirements to achieve the purposes of the solutions of this embodiment.

In addition, the functional units in the various embodiments of the present disclosure may be integrated into one processing unit, or each unit may exist alone physically, or two or more than two units may be integrated into one unit. The above integrated unit may be implemented in the form of hardware, or may be implemented in the form of a software functional unit.

If the integrated unit is implemented in the form of the software functional unit and sold or used as an independent product, it may be stored in the computer readable storage medium. Based on this understanding, the technical solutions of the present disclosure essentially or the parts that contribute to the conventional art, or all or part of the technical solutions may be embodied in the form of a software product. The computer software product is stored in a storage medium, including a plurality of instructions for causing a computer device (which may be a personal computer, a server, or a network device, and the like) to execute all or part of the steps of the method described in the various embodiments of the present disclosure. The foregoing storage medium includes a USB flash disk, an ROM, an RAM, and various media that may store program codes, such as a mobile hard disk, a magnetic disk, or an optical disk.

The above description is merely preferred implementation modes of the present disclosure, and it is to be noted that those of ordinary skill in the art may also make several improvements and refinements without departing from the principle of the present disclosure, and it should be considered that these improvements and refinements shall all fall within the protection scope of the present disclosure.

What is claimed is:

1. A method for storing and reading data, comprising:

acquiring target pixel data of an original image and a pixel parameter corresponding to each piece of pixel data in the target pixel data, wherein the original image is an image for display in a plurality of lamp panels, and the pixel parameter comprises a corresponding relationship between each piece of pixel data in the target pixel data and the plurality of lamp panels;

allocating, according to a pixel address mapping relationship and the pixel parameter, adjacent addresses in a memory to pixel data respectively corresponding to different lamp panels in the target pixel data, so as to determine a memory location where each piece of pixel data in the target pixel data is stored in the memory;

storing each piece of pixel data in the target pixel data to the memory according to the memory location; and successively reading out, according to the pixel address mapping relationship, a set of adjacent pixel data from the memory every time until all the target pixel data is read out from the memory, wherein the target pixel data comprises the adjacent pixel data, and the set of adjacent pixel data comprises pixel data having adjacent addresses in the memory and respectively corresponding to different lamp panels in the plurality of lamp panels;

wherein acquiring the pixel parameter corresponding to each piece of pixel data in the target pixel data comprises: acquiring lamp panel information corresponding to each piece of pixel data in the target pixel data and a location parameter of each piece of pixel data in a lamp panel, wherein the pixel parameter comprises the lamp panel information and the location parameter, and the location parameter comprises a cascade number, a scan number and a channel number of a lamp panel driver chip corresponding to each piece of pixel data;

wherein acquiring the location parameter corresponding to each piece of pixel data in the target pixel data comprises: reading a pre-stored pixel address mapping table, wherein the pixel address mapping table is configured to record a mapping relationship between a pixel and the cascade number and the channel number of the lamp panel driver chip; and acquiring a cascade number and a channel number corresponding to each piece of pixel data in the target pixel data from the pixel address mapping table; and acquiring scanning information of the target pixel data from an image decoding device, wherein the image decoding device is configured to send the target pixel data of the original image; and determine, according to the scanning information, the scan number corresponding to each piece of pixel data in the target pixel data.

2. The method as claimed in claim 1, wherein allocating, according to the pixel address mapping relationship and the pixel parameter, adjacent addresses in the memory to the pixel data respectively corresponding to different lamp panels in the target pixel data, so as to determine the memory location where each piece of pixel data in the target pixel data is stored in the memory comprises:

allocating, according to the pixel address mapping relationship and the pixel parameter, the adjacent addresses in the memory to the pixel data corresponding to different lamp panels but having matched location parameters in the target pixel data, so as to determine the memory location where each piece of pixel data in the target pixel data is stored in the memory.

3. The method as claimed in claim 2, wherein the successively reading out, according to the pixel address mapping relationship, a set of adjacent pixel data from the memory at a time comprises:

determining a set of memory locations in the memory according to the pixel address mapping relationship, wherein the set of memory locations comprises a plurality of adjacent addresses, and pixel data in the plurality of adjacent addresses respectively correspond to different lamp panels but have the matched location parameters; and successively reading out the pixel data stored in the memory location in the memory at once to obtain the set of adjacent pixel data.

4. The method as claimed in claim 1, further comprising:

successively performing, according to a reading order of the adjacent pixel data, data operation processing on each set of adjacent pixel data until all the target pixel data is processed to obtain pixel data to be displayed; and sending the pixel data to be displayed to the lamp panel driver chips of the plurality of lamp panels.

5. The method as claimed in claim 2, further comprising:

successively performing, according to a reading order of the adjacent pixel data, data operation processing on each set of adjacent pixel data until all the target pixel data is processed to obtain pixel data to be displayed; and sending the pixel data to be displayed to the lamp panel driver chips of the plurality of lamp panels.

6. The method as claimed in claim 3, further comprising:

successively performing, according to a reading order of the adjacent pixel data, data operation processing on each set of adjacent pixel data until all the target pixel data is processed to obtain pixel data to be displayed; and sending the pixel data to be displayed to the lamp panel driver chips of the plurality of lamp panels.

7. A non-volatile storage medium, comprising a stored program, wherein the program, when running, controls a device where the non-volatile storage medium is located to perform following actions:

acquiring target pixel data of an original image and a pixel parameter corresponding to each piece of pixel data in the target pixel data, wherein the original image is an image for display in a plurality of lamp panels, and the pixel parameter comprises a corresponding relationship between each piece of pixel data in the target pixel data and the plurality of lamp panels;

allocating, according to a pixel address mapping relationship and the pixel parameter, adjacent addresses in a memory to pixel data respectively corresponding to different lamp panels in the target pixel data, so as to determine a memory location where each piece of pixel data in the target pixel data is stored in the memory;

storing each piece of pixel data in the target pixel data to the memory according to the memory location; and successively reading out, according to the pixel address mapping relationship, a set of adjacent pixel data from the memory every time until all the target pixel data is read out from the memory, wherein the target pixel data comprises the adjacent pixel data, and the set of adjacent pixel data comprises pixel data having adjacent addresses in the memory and respectively corresponding to different lamp panels in the plurality of lamp panels;

wherein acquiring the pixel parameter corresponding to each piece of pixel data in the target pixel data comprises: acquiring lamp panel information corresponding to each piece of pixel data in the target pixel data and a location parameter of each piece of pixel data in a lamp panel, wherein the pixel parameter comprises the lamp panel information and the location parameter, and the location parameter comprises a cascade number, a scan number and a channel number of a lamp panel driver chip corresponding to each piece of pixel data;

wherein acquiring the location parameter corresponding to each piece of pixel data in the target pixel data comprises: reading a pre-stored pixel address mapping table wherein the pixel address mapping table is configured to record a mapping relationship between a pixel and the cascade number and the channel number of the lamp panel driver chip; and acquiring a cascade number and a channel number corresponding to each piece of pixel data in the target pixel data from the pixel address mapping table; and acquiring scanning information of the target pixel data from an image decoding device wherein the image decoding device is configured to send the target pixel data of the original image; and determine, according to the scanning information, the scan number corresponding to each piece of pixel data in the target pixel data.

8. The non-volatile storage medium as claimed in claim 7, wherein allocating, according to the pixel address mapping relationship and the pixel parameter, adjacent addresses in the memory to the pixel data respectively corresponding to different lamp panels in the target pixel data, so as to determine the memory location where each piece of pixel data in the target pixel data is stored in the memory comprises:

allocating, according to the pixel address mapping relationship and the pixel parameter, the adjacent addresses in the memory to the pixel data corresponding to different lamp panels but having matched location parameters in the target pixel data, so as to determine the memory location where each piece of pixel data in the target pixel data is stored in the memory.

9. The non-volatile storage medium as claimed in claim 8, wherein the successively reading out, according to the pixel address mapping relationship, a set of adjacent pixel data from the memory at a time comprises:

determining a set of memory locations in the memory according to the pixel address mapping relationship, wherein the set of memory locations comprises a plurality of adjacent addresses, and pixel data in the plurality of adjacent addresses respectively correspond to different lamp panels but have the matched location parameters; and successively reading out the pixel data stored in the memory location in the memory at once to obtain the set of adjacent pixel data.

10. The non-volatile storage medium as claimed in claim 7, further comprising:

successively performing, according to a reading order of the adjacent pixel data, data operation processing on each set of adjacent pixel data until all the target pixel data is processed to obtain pixel data to be displayed; and sending the pixel data to be displayed to the lamp panel driver chips of the plurality of lamp panels.

11. An image processing device, comprising a processor configured to run a program, wherein the program, when running, performs following actions:

acquiring target pixel data of an original image and a pixel parameter corresponding to each piece of pixel data in the target pixel data, wherein the original image is an image for display in a plurality of lamp panels, and the pixel parameter comprises a corresponding relationship between each piece of pixel data in the target pixel data and the plurality of lamp panels;

allocating, according to a pixel address mapping relationship and the pixel parameter, adjacent addresses in a memory to pixel data respectively corresponding to different lamp panels in the target pixel data, so as to determine a memory location where each piece of pixel data in the target pixel data is stored in the memory;

storing each piece of pixel data in the target pixel data to the memory according to the memory location; and successively reading out, according to the pixel address mapping relationship, a set of adjacent pixel data from the memory every time until all the target pixel data is read out from the memory, wherein the target pixel data comprises the adjacent pixel data, and the set of adjacent pixel data comprises pixel data having adjacent addresses in the memory and respectively corresponding to different lamp panels in the plurality of lamp panels, wherein acquiring the pixel parameter corresponding to each piece of pixel data in the target pixel data comprises: acquiring lamp panel information corresponding to each piece of pixel data in the target pixel data and a location parameter of each piece of pixel data in a lamp panel, wherein the pixel parameter comprises the lamp panel information and the location parameter, and the location parameter comprises a cascade number, a scan number and a channel number of a lamp panel driver chip corresponding to each piece of pixel data;

wherein acquiring the location parameter corresponding to each piece of pixel data in the target pixel data comprises: reading a pre-stored pixel address mapping table, wherein the pixel address mapping table is configured to record a mapping relationship between a pixel and the cascade number and the channel number of the lamp panel driver chip; and acquiring a cascade number and a channel number corresponding to each piece of pixel data in the target pixel data from the pixel address mapping table; and acquiring scanning information of the target pixel data from an image decoding device wherein the image decoding device is configured to send the target pixel data of the original image; and determine, according to the scanning information, the scan number corresponding to each piece of pixel data in the target pixel data.

* * * * *